Nov. 10, 1931.                C. C. FIGGE                 1,831,556
            APPARATUS FOR AND METHOD OF MAKING FLASHINGS
                  Filed July 14, 1928      3 Sheets-Sheet 1
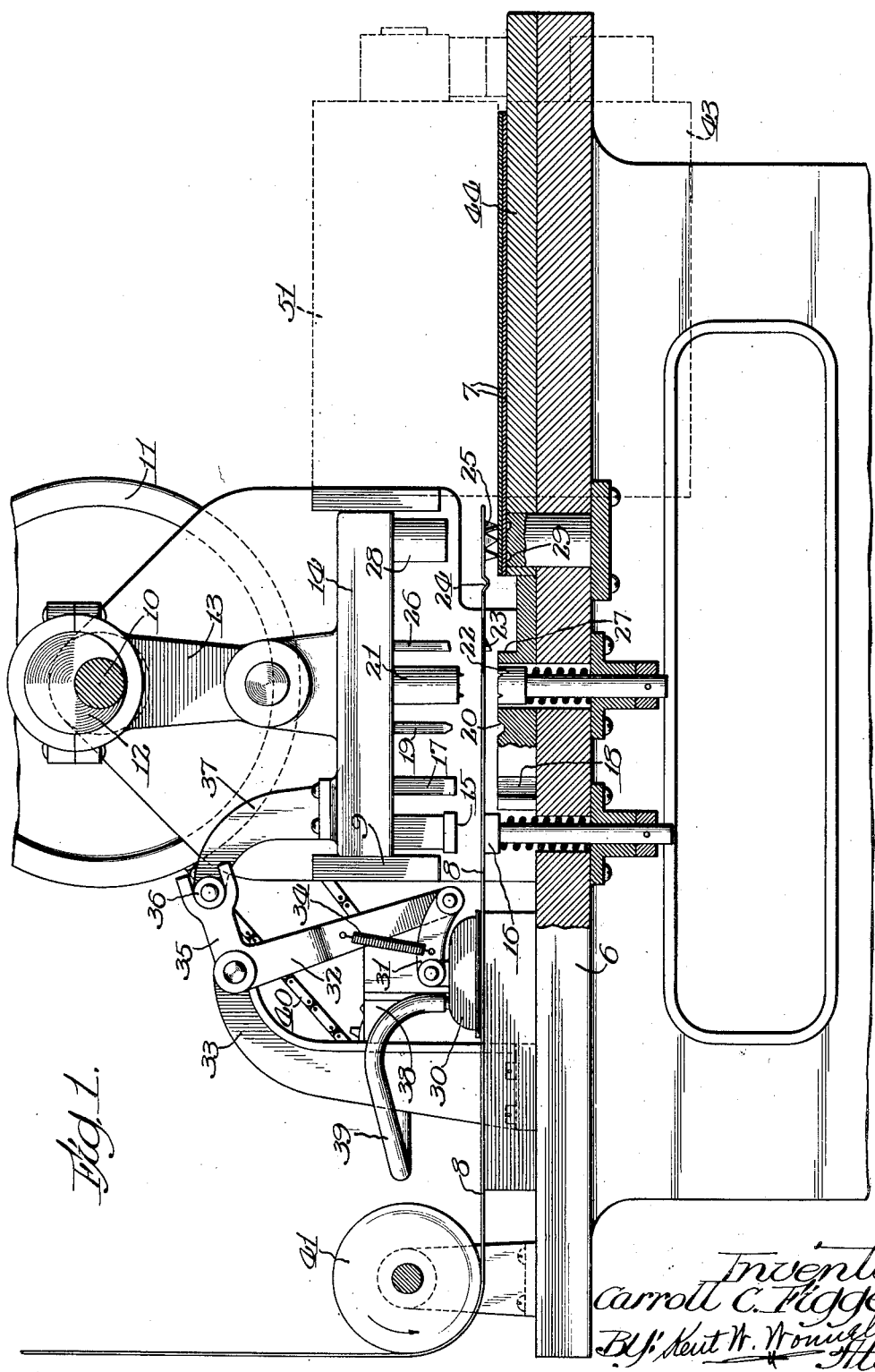

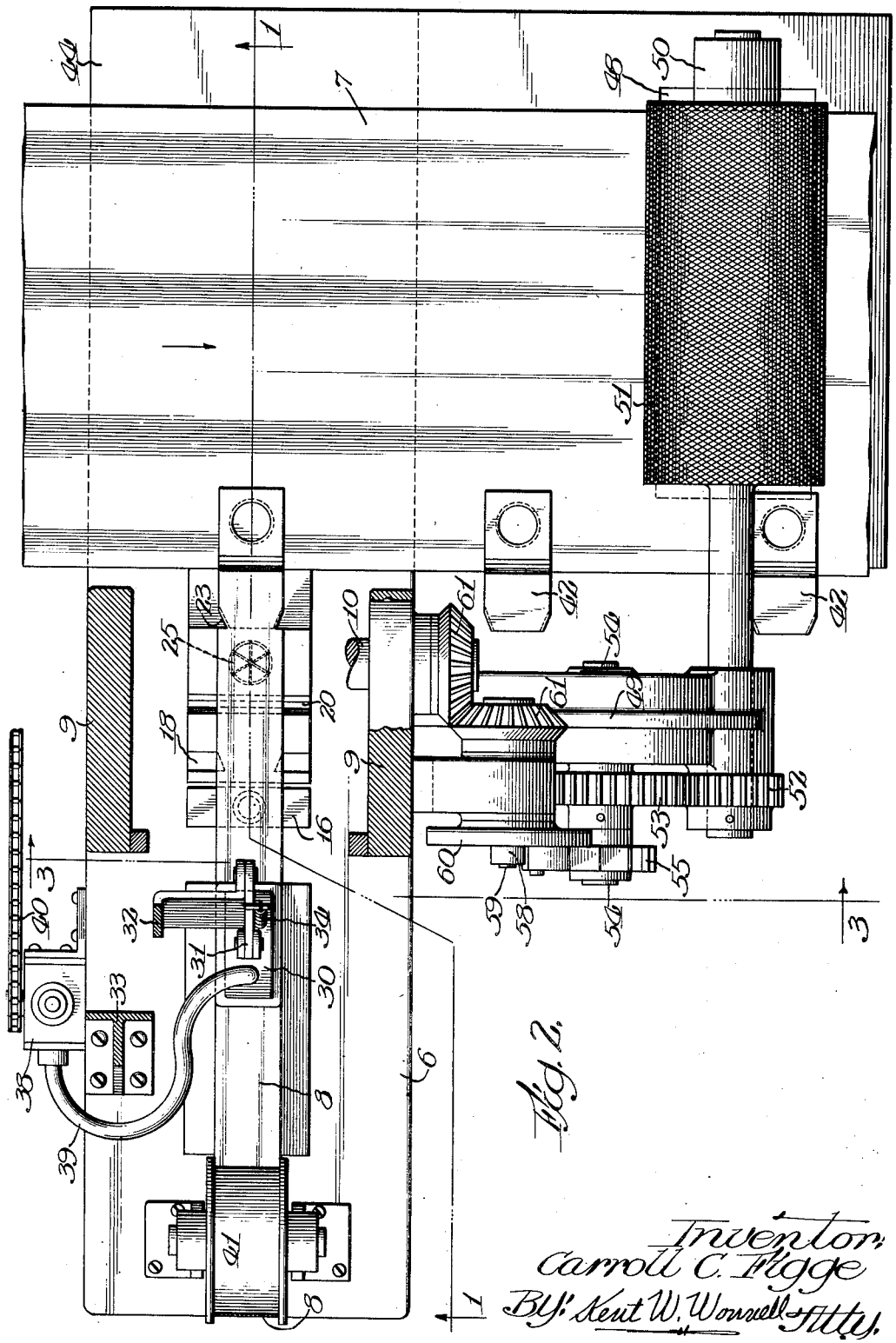

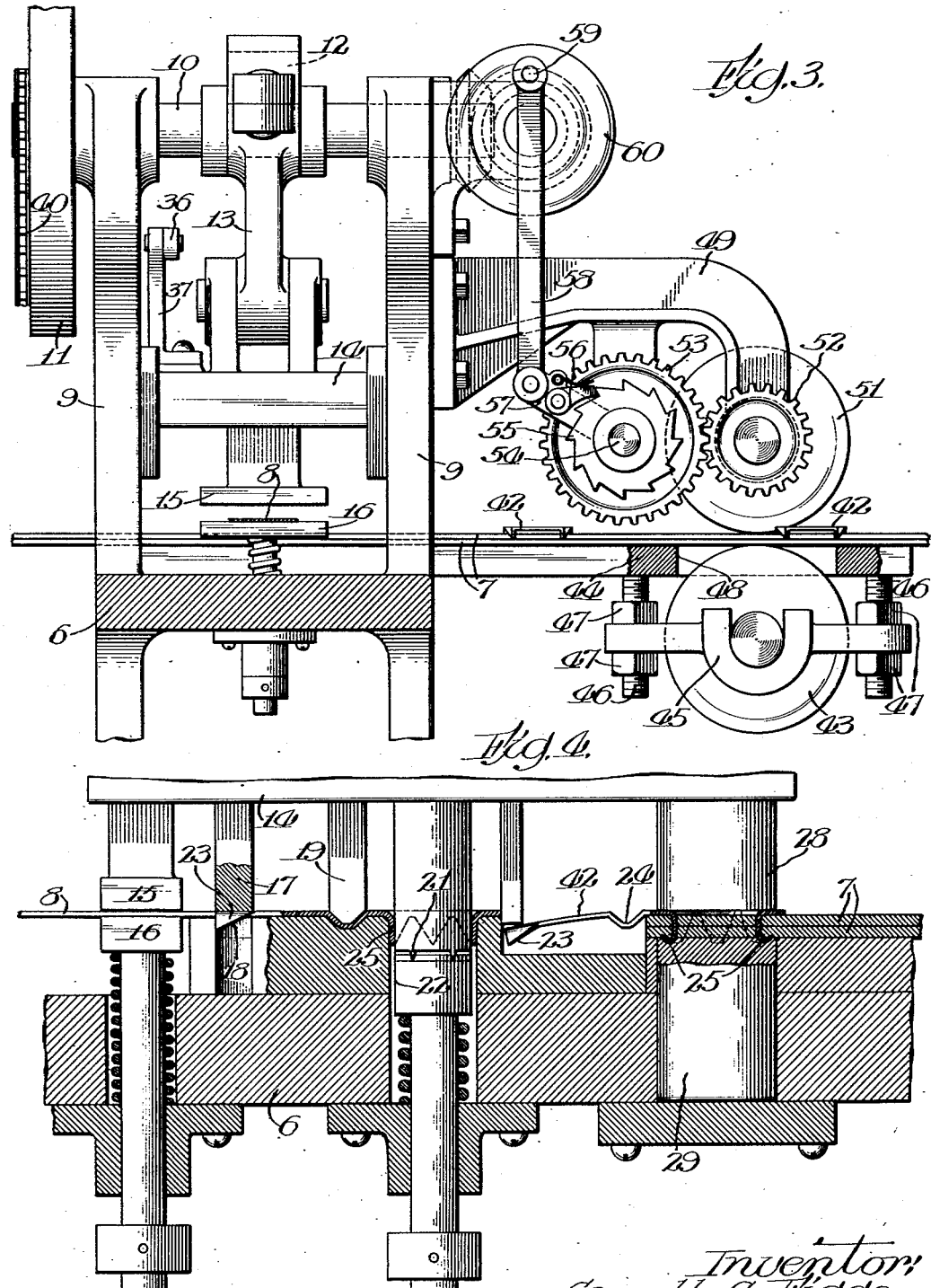

Patented Nov. 10, 1931

1,831,556

UNITED STATES PATENT OFFICE

CARROLL C. FIGGE, OF CHICAGO, ILLINOIS

APPARATUS FOR AND METHOD OF MAKING FLASHINGS

Application filed July 14, 1928. Serial No. 292,854.

This invention relates in general to an apparatus for making flashings used on roofs and similar structures.

One of the principal objects of the invention is the provision of means for applying fasteners at intervals, to the edge of a strip or strips of a flashing material, thereby securing them together and providing means for securing the flashing in a groove or raked-out joint between brick courses.

Further objects of the invention are the making of the flashing fasteners from a continuous strip of metal, the intermittent feeding of the flashing strips and the automatic notching, cutting off and attachment of the flashing clips to the flashing material. Other objects will appear hereinafter.

The accompanying drawings illustrate a preferred embodiment of the invention.

In the drawings, Fig. 1 is a side elevation with parts shown in section of a machine for making a flashing of this kind as taken on the line 1—1 of Fig. 2: Fig. 2 is a sectional plan view of the machine; Fig. 3 is a section taken on the line 3—3 of Fig. 2; and Fig. 4 is an enlarged sectional view taken on the line 1—1 of Fig. 2.

In carrying out this invention, a strip or a number of strips of flashing material are fed intermittently at right angles to the movement of a metal strip which is advanced intermittently, formed, attached to the edge or edges of the strips, and the extremity of the metal strip cut off to form bendable metal attaching clips for the flashing. The apparatus is preferably in the form of a press having a continuous drive and having parts operated intermittently for accomplishing the desired results.

Referring more particularly to the drawings, a press-like machine has a table 6 for receiving one or more strips 7 of flashing material and a strip 8 of metal, both movable intermittently at right angles to each other. The strips of fabric and metal are supplied continuously and freely from rolls (not shown) or any other suitable source of supply.

Extending upwardly from the table 6 at the sides of the metal strip are bearing standards 9 in which a driving shaft 10 is rotatable, the shaft having a driving wheel 11 for a belt connection and having an eccentric 12 between the standards connected by a short link 13 with a die head 14 suitably guided between the standards 9.

Carried by the die head 14 are different tools for operating upon the metal strip 8 as it is advanced; a clamping head 15 coacts with an opposite spring pressed clamping head 16 mounted in the table 6 for holding the strip 8 in an advanced position; a notching tool 17 engages the opposite edges of the strip 8 and with the anvils 18 mounted in the table 6 forms angular teeth 23 in the strip 8; a tool 19 carried by the head and a corresponding notched die 20 carried by the table 6 form a depression 24 in the strip 8; a cutting die 21 carried by the head and a corresponding spring pressed die 22 mounted in the table 6 first cut a number of angular prongs 25 in the strip and then because of the yielding action of the die member 22 turn the angular prongs 25 at right angles to the strip so that they may be attached to the flashing strip 7; a cut-off die 26 carried by the head 14 cooperates with a cut-off die 27 carried by the table 6 and severs the extremity of the strip 8 at the line connecting the teeth 23, and a hammer 28 carried by the head 14 cooperates with a grooved anvil 29 carried by the table 6 for turning over and clinching the extremities of the angular teeth 25 which are formed in the strip by the die members 21 and 22.

The above described operations of the die tools are intermittent and progressive in the sense that the teeth 23, the groove 24 and the angular teeth 25 are formed when the strip 8 is in one position, the strip is then advanced and is cut off and applied to the flashing strip 7 upon the next operation of the die head 14, but all of these operations are performed upon the strip at each actuation of the die head.

To advance the strip 8 intermittently, any desired feeding mechanism may be employed, such, for example, as that shown more clearly by Figures 1 and 2 comprising a vacuum cup 30 supported by means of a link 31 pivoted thereto and to a yoke 32 pivoted upon a bracket 33 supported on the table 6 with a spring 34 connecting the link 31 and the yoke 32. The yoke may be provided with an arm or extension 35 having an open slot at its free end adapted to engage a projection 36 on a bracket 37 carried by the die head 14 so that at each up and down movement of the die head 14 the vacuum cup 30 is reciprocated. A vacuum pump 38 is connected to the cup 30 by a tube 39 and is actuated by a driving chain 40 connected to the driving shaft 10 so that as the vacuum cup 30 is reciprocated it engages the metal strip 8 at the limit of its backward movement, and the vacuum holds it in contact with the strip as the cup is reciprocated by the upward movement of the die head 14. The strip 8 ordinarily passes under a roller 41 for insuring that it will be properly positioned for engagement by the feeding cup 30 for the advancing movement of the strip.

After the angular teeth or prongs 25 are formed in the end of the strip and the die head 14 is raised, the lower spring pressed die members 22 and 16 operate to raise the strip 8 so that the prongs 25 and the formed teeth 23 will clear the lower die members, and the prongs 25 will be positioned above the flashing fabric 7, as clearly shown in Figure 1. The next downward movement of the die head 14 will cut off the end of the strip 8, forming a fastening clip 42, as clearly shown in Figure 4, clinching the teeth 25 through the flashing strip 7 for attachment thereto whereupon the flashing strips may be advanced to receive the next clip 42.

In order to draw the flashing strips into the next position, an adjustable roller 43 is mounted below an extension plate 44 supported by the table 6 by means of a bearing bracket 45 at each end of the roller 43 adjustable upon depending studs 46 by means of nuts 47. By varying the nuts this roller 43 may be adjusted in an opening 48 of the plate 44 to bear on the under side of the flashing strip 7. Mounted at one end in a bracket 49 secured to one of the supports 9 and at the other end in a bearing 50 secured to the plate 44 is a roller 51 adapted to engage the upper side of the flashing strip 7 above the roller 43, the two rollers 43 and 51 constituting means for advancing the flashing intermittently. Secured to the roller 51 at one end is a gear 52 meshing with a larger gear 53 secured to a shaft 54 which also has a toothed ratchet 55 secured thereto. A spring pressed feeding pawl 56 is mounted upon an arm 57 journaled at one end upon a shaft 54 and having its other end connected by means of a link 58 with a crank pin 59 upon a crank disk 60 which is driven continuously by bevel gears 61 from the main drive shaft 10.

Continuous rotation of the shaft 10 actuates the crank disk 60 and the pawl and ratchet mechanism to intermittently rotate the roller 51, and this mechanism is operative to actuate the roller immediately after the application of a fastening clip 42 to the flashing strips 7. The feeding rollers 51 and 43 are sufficient to hold the flashing strip 7 in place for the application of the clips 42 and to draw the strips from a feeding roll or rolls of the flashing strip material at one side of the machine.

With this construction it is obvious that the parts described are so connected and related that the operation of applying the flashing clips 42 to the flashing strips 7 is entirely automatic and continuous and requires only a continuous supply of these parts to function continuously. The strips with the clips applied may be cut off to any desired length.

I claim:

1. The method of making flashing which comprises intermittently feeding a plurality of flashing fabric strips, intermittently feeding a sheet metal strip at an angle thereto, in forming an attachment clip with attachment prongs and a bending groove, and in applying and cutting off an attachment clip already formed from the end of the strip at the same operation, in securing together a plurality of plies of flashing by the attachment of the fastening clip thereto with the clip extending free of the edges thereof and the groove at the edges of the plies, and in cutting off the flashing thus formed to any desired length.

2. The method of making flashing which consists in feeding a plurality of flashing strips in overlying relation, and a metal strip at an angle to each other, in advancing the fabric strips together intermittently for applying fastening clips at regular intervals, in feeding the strip intermittently, in forming a fastening clip at the end of the metal strip having attachment prongs and a bending groove, in clinching the prongs through the flashing strips, and in applying the formed attachment clip to the edges of the flashing strips with the bendable extremity extending beyond the fabric edges, and clinching the prongs of the clip through the strips for attaching them together and in cutting off the attachment clip thus applied to the strips.

3. The method of making flashing which consists in feeding a flashing strip and a metal strip at right angles to each other, in forming the end of the metal strip with prongs, a bending groove, and teeth, in applying the clip thus formed to the edge of the strip by inserting the prongs through the strip and clinching them on the under side with the other end extending free beyond the edge of the strip, and in cutting off the clip on a line with the teeth previously formed.

4. An apparatus for making flashing which comprises means for intermittently feeding fabric strips, a reciprocating die head, means for advancing a metal strip intermittently toward the fabric strip, means for forming the end of the strip with attachment prongs, teeth, and a bending groove, and means for applying the formed clip to and projecting beyond the edge of fabric strips and clinching them therethrough and cutting off the clip adjacent the formed teeth therein.

5. The method of making roofing which consists in feeding material impervious to water and strip metal at an angle to each other, in cutting off and clinching a fastening clip of metal through the material and leaving a portion of the clip free for attaching the material to a roof, and in forming a bending groove in the clip which is disposed at the edge of the material so it may be bent at the groove in attaching it to a roof.

CARROLL C. FIGGE.